Feb. 18, 1964   I. E. SPERRY ETAL   3,121,293
DEVICE FOR SIMULATING THE SOUND OF A GASOLINE ENGINE
Filed Nov. 30, 1960
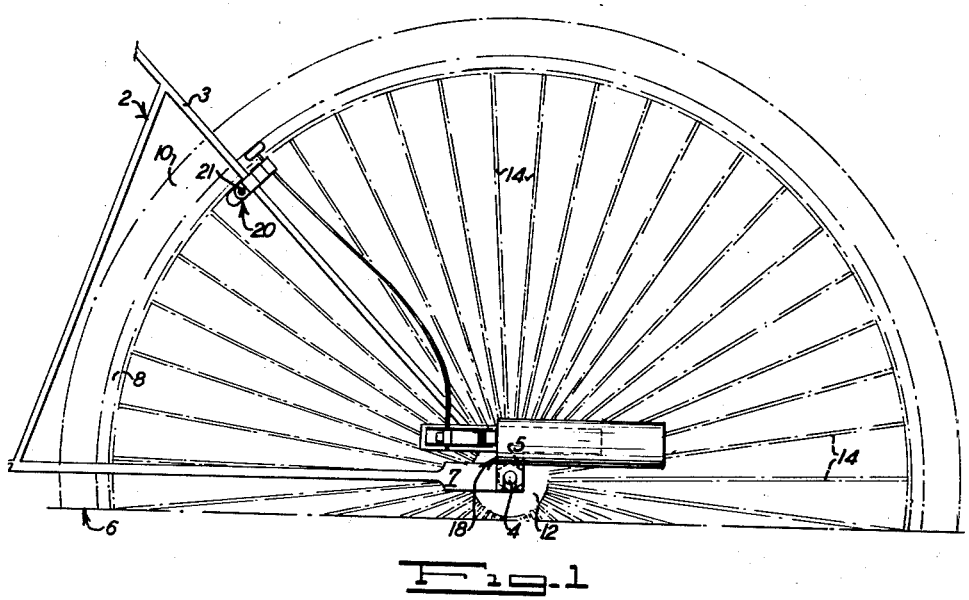
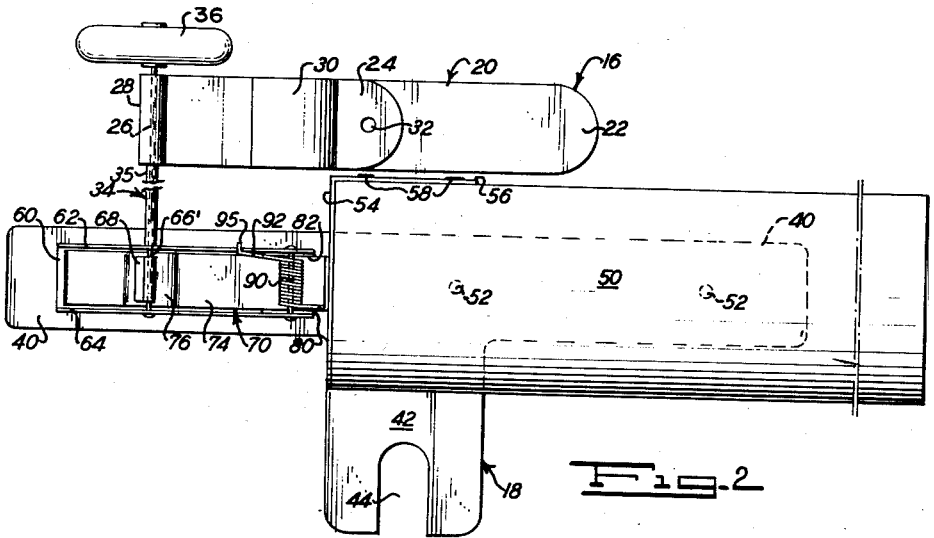
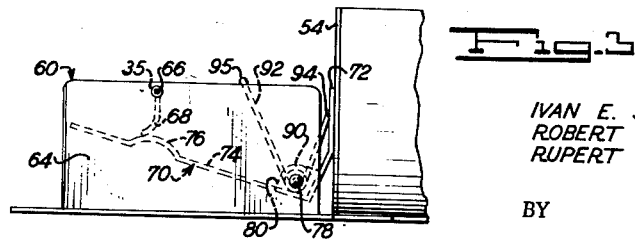
INVENTORS
IVAN E. SPERRY
ROBERT R. JARDON
RUPERT L. THOMAS
BY *Jacobi & Jacobi*
ATTORNEYS United States Patent Office 3,121,293
Patented Feb. 18, 1964

3,121,293
DEVICE FOR SIMULATING THE SOUND OF A GASOLINE ENGINE
Ivan E. Sperry, 1824 Fenmore Place; Robert R. Jardon, 2928 E. Utah; and Rupert L. Thomas, 24 Hayman, all of Colorado Springs, Colo.
Filed Nov. 30, 1960, Ser. No. 72,654
5 Claims. (Cl. 46—175)

This invention relates to devices adapted to simulate the sound of a gasoline engine and/or the exhaust thereof. More particularly, this invention relates to such a device which is particularly adapted to be attached to a vehicle powered by the user thereof, such as, for example, a bicycle.

While various types of sound-stimulating devices have previously been suggested, and while some of such devices could be used on vehicles powered by the users thereof, generally the prior suggestions for use on "self-powered" vehicles were either (1) difficult, and therefore somewhat expensive, to fabricate or assemble; (2) faulty in operation; or (3) made from components which were readily worn from continued use.

In contrast to previous suggestions, the present invention has as one of its primary objects the provision of a device adapted to be used on a bicycle or the like for simulating the sound of a gasoline engine and/or the exhaust thereof, which device is easily and inexpensively manufactured, trouble-free in operation, and at the same time, formed from components which can be subjected to continuous and repeated operating cycles without showing any signs of substantial wear.

Still a further primary object of the present invention is to provide a sound-simulating device conforming with the preceding object, which device includes drive means adapted to engage a wheel of a "self-powered" vehicle whereby the simulated sounds are produced by the device directly in response to rotation of the vehicle wheel.

Yet another, and still further primary object of the present invention is to provide a sound-simulating device as prescribed above, which device enhances the appearance of a vehicle to which it is attached, and includes bracket means for carrying the operating components, which bracket means can be easily secured on the frame of a vehicle with which the device is being used by one with no special mechanical skills.

Still further, other, and more specific objects of the present invention are to provide a device adapted to simulate the sound of a gasoline engine in response to movement of a vehicle having a rotatable vehicle wheel, and by which vehicle the device is carried, wherein all of the aforestated objects are satisfied, and wherein (a) the device includes a sounding member, means for striking the sounding member, and amplifying means disposed to amplify sounds resulting from striking of the sounding member; (b) the device includes a hammer as the means for striking the sounding member, spring means for normally urging the hammer into engagement with the sounding member, and cam means coupled with the device drive wheel for automatically moving the hammer away from engagement with the sounding member and then releasing the hammer whereby it strikes the sounding member repeatedly in response to revolution of the vehicle wheel; and (c) the device includes a flexible shaft coupling between the device drive wheel and the cam means, and suitable bracket means, whereby the drive wheel can be attached to the frame of the vehicle in engagement with the vehicle wheel, and the other components of the device can be carried by a separate bracket attached to the frame of the vehicle at a desired location remote from the drive wheel.

In addition to the foregoing objects, an important specific object of the present invention is to provide a sound-simulating device conforming with all of the preceding objects and incorporating a megaphone as the sound-amplifying means and an anvil-type sounding member carried by the megaphone in sound-insulated relation to a bracket supporting the megaphone and anvil.

The invention consists in the construction, arrangements and combination of the various parts of the sound-simulating device as described in detail below. From the following description, the invention will be better understood and objects other than those specifically set forth above will become apparent.

The description refers to the illustrative and preferred embodiments of the invention presented in the annexed drawings, wherein:

FIGURE 1 is a side view of the rear portion of a bicycle having a sound-simulating device constructed in accordance with the present invention attached thereto;

FIGURE 2 is a side view showing the detailed construction and arrangemetn of components of the sound-simulating device shown in FIGURE 1; and FIGURE 3 is a fragmental detailed view of the sound-generating portion of the device shown in FIGURE 2, FIGURE 3 showing specifically the cooperative disposition of the sounding member, hammer adapted to strike the sounding member, spring means used to urge the hammer member normally into engagement with the sounding member, and cam means used to move the hammer member away from the sounding member and then release the same for striking the sounding member, as provided in accordance with the preferred embodiments of the present invention.

In FIGURE 1, the numeral 2 is generally used to designate the frame of a bicycle. Secured to the frame 2 of the bicycle, in the usual manner, is a shaft 4 on which is journaled a rotatable vehicle wheel generally designated by the numeral 6. The wheel, as shown, includes a rim 8, a tire member 10 carried by the rim, a hub 12 journaled for rotation on the shaft 4, and a plurality of spokes 14 which support the rim, and thereby the tire member concentrically with the hub 12.

The sound-simulating device of the present invention, which is generally designated by the numeral 16 (FIGURE 2) is particularly adapted for use with a bicycle having a frame and a wheel such as described in the preceding paragraph, however, it should be understood that the device can also be used with various other types of vehicles without departing from the scope and spirit of the invention.

Preferably, as shown in FIGURES 1 and 2, the sound-simulating device 16 includes a pair of bracket members 18 and 20 which are adapted to be coupled with the frame of the vehicle to support the components of the device thereon, in a manner explained in detail hereinafter. The bracket member 20 serves to support the driving components of the sound-simulating device provided by the invention, and the bracket member 18, in contrast, serves to support the sound-producing components of the device which are operated by the driving components. The bracket member 18 includes a bracket plate 40, and carried on the right end portion of the bracket plate 40 as shown in FIGURE 2, is a megaphone 50. The megaphone is preferably cylindrical in shape and secured to the bracket plate by means of rivets or the like 52. Carried on the left end of the megaphone 50, generally centrally of the elongated bracket plate 40, is a sounding member 54 which covers the left end of megaphone 50, and is coupled to the megaphone by means of a coupling flange 56 suitably attached to the megaphone by rivets such as those designated by numeral 58. The sounding member 54 is thus carried by the megaphone 50 in spaced relation to the bracket 40. The megaphone 50 is preferably made from a pressed cardboard, plastic, or other suitable material, and thus the sounding member 54 is generally "soundwise" insulated from the bracket plate 40 which may be formed of a good sound-conductor such as metal.

Carried on the left end of the elongated bracket plate 40 and attached thereto by any suitable means such as a weld or rivets, is a generally U-shaped bracket 60 having upstanding side walls 62 and 64 disposed in spaced-apart relation. The side walls 62 and 64 are provided with aligned bores spaced from the base of the U-shaped bracket through which the inner rotatable member 66 of a flexible shaft 34 passes.

Affixed to the end 66′ of the flexible shaft 34, and disposed between the upstanding side walls 62 and 64 of bracket 60 is a cam member 68. The flexible shaft 34, as suggested, comprises an outer casing 35 with the rotatable member 66 carried therein as is customary for construction of flexible shafts. By virtue of the above-described coupling between the cam member and the flexible shaft, the cam member 68 is rotatably drivable by the flexible shaft 34.

The cam member, as best shown in FIGURE 3, upon rotation moves a hammer member generally designated by the numeral 70. The hammer member 70 comprises a head 72 and an arm 74 provided with a cam-engaging projection 76 thereon. Attached to the hammer, and secured in flanges 80 and 82 carried on opposite sides of the hammer at the junction of the arm and the head thereof, is a rivet shaft 78. The shaft 78 extends through alinged apertures in the upstanding side walls 62 and 64 of the U-shaped bracket 60 whereby the hammer member 70 is pivotally mounted with respect to the base of the U-shaped bracket 60 and with respect to the sounding member 54.

A coil spring 90 is disposed about the shaft 78 in encasing relation therewith, and spring arms 92 and 94 extend outwardly from the spring member 90. The arm member 92 has an outwardly-bent end 95 which extends over the top of the upstanding side wall or flange 62 of U-shaped bracket 60 and the arm member 94 extends into engagement with the head 72 of the hammer member 70. By virtue of this construction, the spring member 90 serves to continuously press the head 72 of hammer 70 into engagement with the sounding member 54. Also, the spring normally maintains the arm 74 of the hammer in the position shown in FIGURE 3.

However, when the flexible shaft is driven by a drive wheel 36 as explained in detail below, the inner flexible shaft member 66 drives the cam member 68. This cam member upon rotation engages the cam projection 76 of the arm member 74 of the hammer and serves to depress the same thereby moving the head 72 of the hammer 70 away from the sounding member 54. When the cam member 68 has passed over the projection 76, then the arm member 74 is immediately released, and under the action of the spring, the head 72 of the hammer strikes the sounding member. The sound so created is amplified by the megaphone or sound amplifying means 50.

The drive wheel 36 is fixed on the end of the inner flexible shaft member 66 opposite that carrying cam 68, and is supported by bracket 20, with the periphery of the drive wheel 36 in engagement with vehicle wheel 6.

The bracket member 20 as shown is of the clip-type and comprises an elongated base member 22 integral with a folded-over top member 24. The folded end of the base member 22 and adjacent portion of the top member 24 are formed to provide an at least generally circular recess 26 at the end 28 of the bracket member 20 and a frame-engaging recess 30 spaced from the recess 26. In addition, members 22 and 24 are provided with aligned apertures which define an opening 32 through which a suitable bolt may be passed to secure the bracket member 20 to frame 2 of the vehicle.

The flexible shaft 34, having the drive wheel 36 secured on the end thereof, is passed between the members 22 and 24 of the bracket 20 and secured in the recess 26 with the drive wheel 36 disposed adjacent one side of the bracket 20. With the components so assembled, the bracket 20 is then moved onto a frame member of the vehicle, such as that designated by numeral 3 (FIGURE 1) by pressing the bracket onto the frame so that the frame member moves between the bracket members 22 and 24 and into the recess 30. Then, a suitable bolt such as that designated by numeral 21 is passed through the opening 32 and the bracket member 20 is tightened onto the frame with the drive wheel 36 engaging the vehicle wheel member 6, or preferably, the rim 8 thereof.

The bracket 18, which includes the elongated bracket plate 40 and a depending arm portion 42 integral with the plate 40, is, like bracket 20, also adapted to be easily attached to the vehicle frame. The bracket 40, however, carries the sound-producing components including the U-shaped channel or hammer bracket 70.

The arm portion 42 of bracket 18 is provided with an elongated recess 44 having a width adapting it to be slipped over the axle 4 of the vehicle wheel 6. The axle 4, as used in standard bicycle construction, is provided with threaded ends onto which nuts, such as that designated by numeral 5, can be screwed. Normally, one of the bicycle frame members, such as that designated by numeral 7, is provided with a slot for receiving the axle 4, and the axle is slipped into the slot and tightened to the frame by the nuts 5.

Thus, to secure the bracket 18 of the subject device on a standard bicycle, it is merely necessary to loosen a shaft nut 5, place the depending arm member or portion 42 of the bracket 18 over the axle 4 behind the nut, and then retighten the nut 5 to secure the bracket in place.

It will be noted that the drive wheel 36 has a diameter which is comparatively small in relation to the vehicle wheel 6, or more particularly, to rim member 8 thereof. As a result, as the vehicle moves and the vehicle wheel makes one revolution, the drive wheel 36 makes many revolutions, causing the head 72 of the hammer 70 to strike the sounding member 54 once for each revolution of the drive wheel 36, but many times for each revolution of vehicle wheel 6.

For best operation, I have found that the hammer member, or more particularly the head thereof, should be a planar striking face such as shown in FIGURE 3, because such construction results in a closer simulation of the sound of a gasoline engine or the exhaust thereof, upon movement of the vehicle to which the device of the invention is attached.

After reading the foregoing description it should be apparent that the objects set forth at the outset of this specification have been successfully achieved. Various modifications of the illustrative and preferred embodiment of the invention will undoubtedly become apparent to those of ordinary skill in the art.

What is claimed is:

1. A device adapted to simulate the sound of a gasoline engine in response to movement of a vehicle having a frame and a rotatable vehicle wheel, said device comprising a drive wheel, first bracket means adapted to be coupled to said frame for supporting said drive wheel with the periphery thereof engaging said vehicle wheel for rotation therewith, a flexible shaft having one end drivingly coupled with said drive wheel, second bracket means adapted to be coupled with said frame in remotely disposed relationship with respect to said first bracket means, a sounding member, sound amplifying means carried by said second bracket means and disposed to amplify sounds resulting from the striking of said sounding member, said sounding member being positioned upon said sound amplifying means and being sound insulated from said second bracket means, a hammer mounted on said second bracket means, said hammer having a moveably mounted arm member and a head member carried thereby and moveable to and from a position engaging said sounding member, spring means for normally urging said head member in one direction, and cam means including a cam member rotatably carried by said second bracket means and disposed to displace said arm member against the action of said spring and then release said arm member for each rotation of said cam whereby said hammer member is caused to strike said sounding member at least once for each rotation of said cam, said cam being drivingly coupled with said flexible shaft for rotation in response to rotation of said drive wheel.

2. A device adapted to simulate the sound of a gasoline engine as defined in claim 1 wherein said hammer comprises a generally L-shaped member, one leg of said L-shaped member forming said arm member and the other leg of said L-shaped member forming said head member; wherein said hammer is pivotally mounted on said second bracket means whereby said hammer member is movable about the pivotal mounting to and from said position engaging said sounding member, and wherein said spring means comprises a coil spring carried at said pivotal mounting, said spring having at least two spring arms, one of said spring arms bearing against said head member and the other of said spring arms bearing against said second bracket means.

3. A device adapted to simulate the sound of a gasoline engine as defined in claim 2 wherein said second bracket means includes a plate member and a U-shaped channel having spaced side flanges secured to said plate member; wherein said L-shaped member is pivoted between the side flanges of said U-shaped channel; wherein said cam member is journaled for rotation on a shaft extending between said side flanges of said U-shaped member; wherein said hammer member includes a planar striking face; and wherein said arm member includes a cam bearing projection disposed to cooperatively engage said cam member.

4. A device adapted to simulate the sound of a gasoline engine as defined in claim 1 wherein said arm member is provided with a cam engaging projection thereon for coacting with said cam member.

5. A device adapted to simulate the sound of a gasoline engine in response to movement of a vehicle having a frame and a rotatable vehicle wheel including a rim and a tire carried on said rim, said device comprising, in combination, a drive wheel, a drive wheel bracket adapted to be coupled to said frame to support said drive wheel with the periphery thereof engaging said rim for rotation therewith, a flexible shaft having said drive wheel fixedly secured on one end thereof, an elongated bracket plate having a depending arm portion for attaching said plate to the vehicle in remotely disposed relationship with respect to said first bracket means, a megaphone carried by said bracket plate on one end portion thereof, a sounding member positioned upon said megaphone and disposed generally centrally of said bracket plate and being sound insulated therefrom, a hammer bracket carried on said plate on the other end portion thereof, a hammer mounted on said hammer bracket, said hammer having a movably mounted arm member and a head member carried thereby and movable to and from a position engaging said sounding member, said hammer bracket moveably mounting said hammer, separate spring means for normally urging said head member in one direction, sam means including a rotatable cam member carried on said plate and disposed to engage said arm member at a location remote from said head member is displace said arm member against the action of said spring and then release said arm member for each rotation of said cam whereby said head member is caused to strike said sounding member at least once for each rotation of said cam, said cam being fixed on the end of said flexible shaft opposite said one end for rotation with said drive wheel.

References Cited in the file of this patent
UNITED STATES PATENTS

| | | |
|---|---|---|
| 563,834 | Zinn | July 14, 1896 |
| 618,107 | Kraushaar | Jan. 24, 1899 |
| 1,571,695 | Beliveau | Feb. 2, 1926 |
| 2,609,640 | Newell et al. | Sept. 9, 1952 |
| 2,914,886 | Barthel | Dec. 1, 1959 |